(12) United States Patent
Yi et al.

(10) Patent No.: US 9,509,479 B2
(45) Date of Patent: Nov. 29, 2016

(54) METHOD AND APPARATUS FOR SUPPORTING BURST TRANSMISSION IN A WIRELESS COMMUNICATION SYSTEM

(71) Applicant: LG ELECTRONICS INC., Seoul (KR)

(72) Inventors: Yunjung Yi, Seoul (KR); Dongyoun Seo, Seoul (KR); Hanbyul Seo, Seoul (KR); Joonkui Ahn, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/420,628

(22) PCT Filed: Aug. 9, 2013

(86) PCT No.: PCT/KR2013/007197
§ 371 (c)(1),
(2) Date: Feb. 9, 2015

(87) PCT Pub. No.: WO2014/025228
PCT Pub. Date: Feb. 13, 2014

(65) Prior Publication Data
US 2015/0215097 A1    Jul. 30, 2015

Related U.S. Application Data

(60) Provisional application No. 61/681,631, filed on Aug. 10, 2012.

(51) Int. Cl.
*H04W 4/00*         (2009.01)
*H04L 5/00*         (2006.01)
(Continued)

(52) U.S. Cl.
CPC ........... *H04L 5/0055* (2013.01); *H04L 1/1829* (2013.01); *H04L 5/001* (2013.01);
(Continued)

(58) Field of Classification Search
CPC ... H04L 5/0055; H04L 5/0032; H04L 5/001; H04L 1/1829; H04L 1/1671; H04L 1/0026; H04W 72/042; H04W 52/48; H04W 52/146; H04W 52/325
See application file for complete search history.

(56) References Cited

U.S. PATENT DOCUMENTS

2012/0269140 A1* 10/2012 Nam .................. H04B 7/024
                                                          370/329
2012/0269179 A1* 10/2012 Li ..................... H04L 1/1854
                                                          370/336
(Continued)

FOREIGN PATENT DOCUMENTS

WO    2012/015212    2/2012
WO    2012/086932    6/2012

OTHER PUBLICATIONS

Pantech, "On PDCCH bundling," 3GPP TSG-RAN WG1 #66, R1-112285, Aug. 2011, 3 pages.
(Continued)

*Primary Examiner* — Clemence Han
(74) *Attorney, Agent, or Firm* — Lee, Hong, Degerman, Kang & Waimey

(57) ABSTRACT

A method for and apparatus for supporting burst transmission in a wireless communication system supporting multiple carriers is provided. A wireless device receives a PDCCH for the burst transmission via a first serving cell and transmits a response of the PDCCH via the first serving cell. And then, the wireless device receives PDSCHs for the burst transmission via a second serving cell and transmits a response of the PDSCHs via the first serving cell.

8 Claims, 10 Drawing Sheets

(51) Int. Cl.
*H04L 1/18* (2006.01)
*H04W 72/04* (2009.01)
*H04L 1/00* (2006.01)
*H04L 1/16* (2006.01)
*H04W 52/14* (2009.01)
*H04W 52/32* (2009.01)

(52) U.S. Cl.
CPC ......... *H04L 5/0032* (2013.01); *H04W 72/042* (2013.01); *H04L 1/0026* (2013.01); *H04L 1/1671* (2013.01); *H04W 52/146* (2013.01); *H04W 52/325* (2013.01)

(56) References Cited

U.S. PATENT DOCUMENTS

| | | | | |
|---|---|---|---|---|
| 2012/0307689 A1* | 12/2012 | Kim | ..................... | H04L 1/1861 370/280 |
| 2013/0223295 A1* | 8/2013 | Choi | ................. | H04W 72/0406 370/280 |
| 2013/0308550 A1* | 11/2013 | Yin | ......................... | H04L 5/001 370/329 |
| 2015/0131602 A1* | 5/2015 | Kim | ...................... | H04L 1/1861 370/329 |

OTHER PUBLICATIONS

Samsung, "Pcell vs. Scell based timing in case of PDSCH cross-carrier scheduling," 3GPP TSG RAN WG1 #69, R1-122224, May 2012, 3 pages.

New Postcom, "Multi-subframe scheduling for eDDA," 3GPP TSG-RAN2#76, R2-115985, Nov. 2011, 4 pages.

PCT International Application No. PCT/KR2013/007197, Written Opinion of the International Searching Authority dated Nov. 27, 2013, 1 page.

* cited by examiner

— METHOD AND APPARATUS FOR SUPPORTING BURST TRANSMISSION IN A WIRELESS COMMUNICATION SYSTEM

CROSS-REFERENCE TO RELATED APPLICATIONS

This application is the National Stage filing under 35 U.S.C. 371 of International Application No. PCT/KR2013/007197, filed on Aug. 9, 2013, which claims the benefit of U.S. Provisional Application Ser. No. 61/681,631, filed on Aug. 10, 2012, the contents of which are hereby incorporated by reference herein in their entirety.

TECHNICAL FIELD

The present invention relates to wireless communications, and more particularly, to a method and apparatus for supporting burst transmission in a wireless communication system supporting multiple carriers.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users?demand for services that may support higher quality and higher capacity while ensuring mobility, as well as voice services. The LTE system provides for low transmission delay, high transmission rate and system capacity, and enhanced coverage.

To increase the capacity for the users?demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. For example, exchanging ACK (Acknowledgement)/NACK (Non-Acknowledgement) information for performing HARQ (Hybrid Automatic Repeat reQuest), controlling power of the HARQ, and the like, are required.

DISCLOSURE

Technical Problem

The present invention provides a method and apparatus for supporting burst transmission in a wireless communication system supporting multiple carriers.

The present invention also provides a method and apparatus for transmitting control information for burst transmission in a wireless communication system supporting multiple carriers.

The present invention also provides a method and apparatus for transmitting an ACK/NACK signal for burst transmission in a wireless communication system supporting multiple carriers.

The present invention also provides a method and apparatus for controlling power of an ACK/NACK signal for burst transmission in a wireless communication system supporting multiple carriers.

Technical Solution

In an aspect, a method for supporting burst transmission in a wireless communication system supporting multiple carriers is provided. The method nay include receiving a physical downlink control channel (PDCCH) for the burst transmission via a first serving cell at $n^{th}$ subframe, transmitting a response signal of the PDCCH via the first serving cell, receiving physical downlink shared channel (PDSCH)s for the burst transmission via a second serving cell from $n+k^{th}$ subframe, and transmitting at least one response signal of the PDSCHs via the first serving cell.

The method may further include that the PDCCH includes a number of PDSCHs to be transmitted in a burst transmission cycle.

The method may further include sending a ACK/NACK signal, wherein the ACK/NACK signal is one among a single ACK/NACK signal for the PDSCHs, a separate ACK/NACK signal for each PDSCH, a selective ACK/NACK including a ACK signal if more than R PDSCHs out of N PDSCHs are received or a NACK signal otherwise, and ACK/NACK signals including a ACK signal if more than R PDSCHs out of N PDSCHs are received and a NACK signal that the number of PDSCHs are not received successfully.

In another aspect, a wireless device for supporting burst transmission in a wireless communication system supporting multiple carriers is provided. The wireless device includes a radio frequency unit for receiving a radio signal, and a processor, operatively coupled with the radio frequency unit, configured to receive a physical downlink control channel (PDCCH) for the burst transmission via a first serving cell at $n^{th}$ subframe, transmit a response signal of the PDCCH via the first serving cell, receive physical downlink shared channel (PDSCH)s for the burst transmission via a second serving cell from $n+k^{th}$ subframe and transmit at least one response signal of the PDSCHs via the first serving cell.

Advantageous Effects

This invention provides that the at least two serving cells with different coverage can be used for burst data transmission, herein each serving cell can be controlled by an eNB for control and only data extension. Especially, control information as an ACK/NACK, or PDCCH is transmitted via a serving cell used for control, thus the burst data transmission between the UE and the eNB can be complied with accurately. It can be advantaged that an ACK/NACK can performed in consideration of power control of burst data transmission such as an offset and the number of PDSCHs subframes of the burst data transmission. Thus the reliability of the ACK/NACK and the burst data transmission can be supported more accurately and efficiently.

MODE FOR INVENTION

Figure 1:
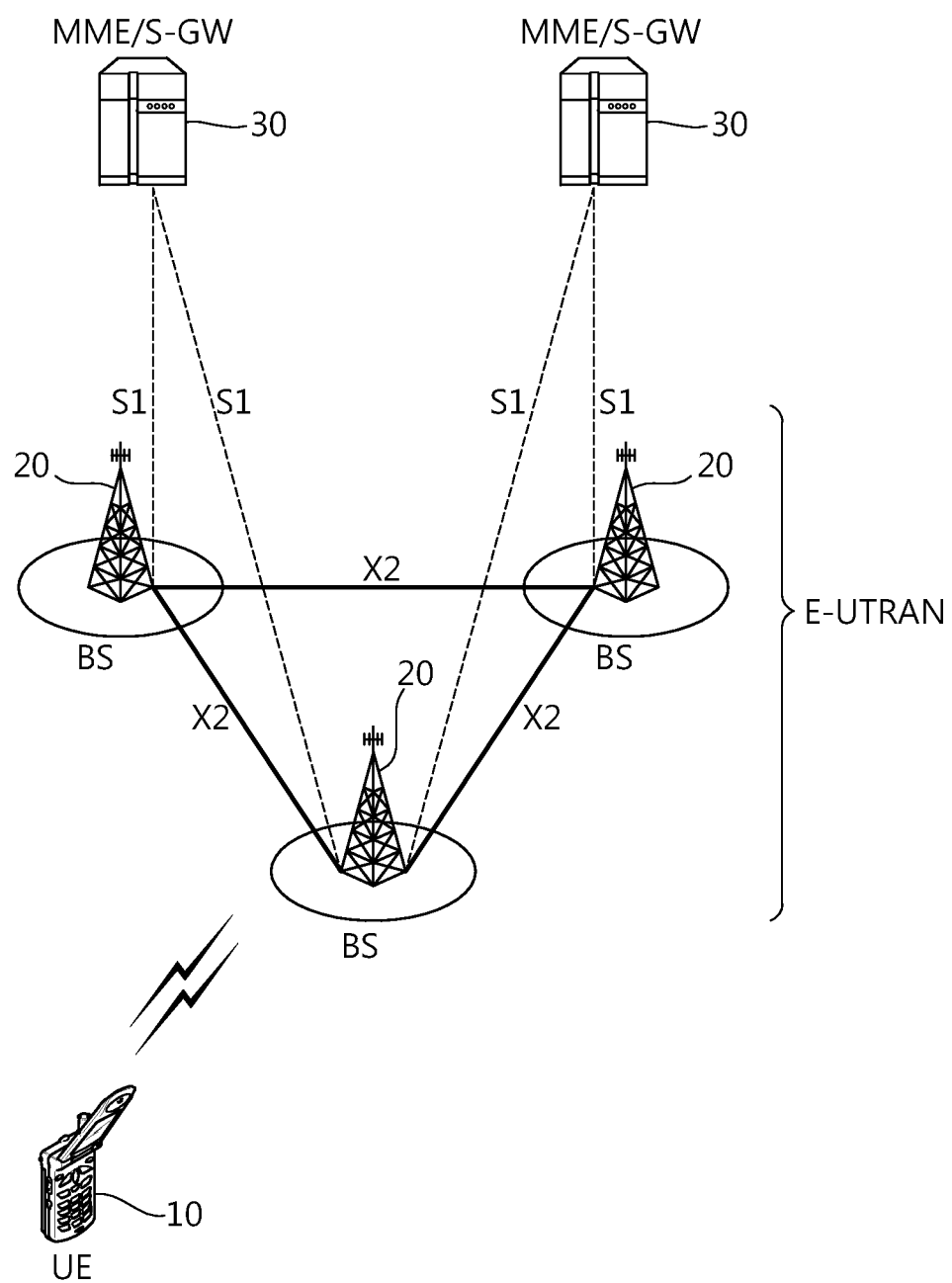
FIG. 1 is view illustrating a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
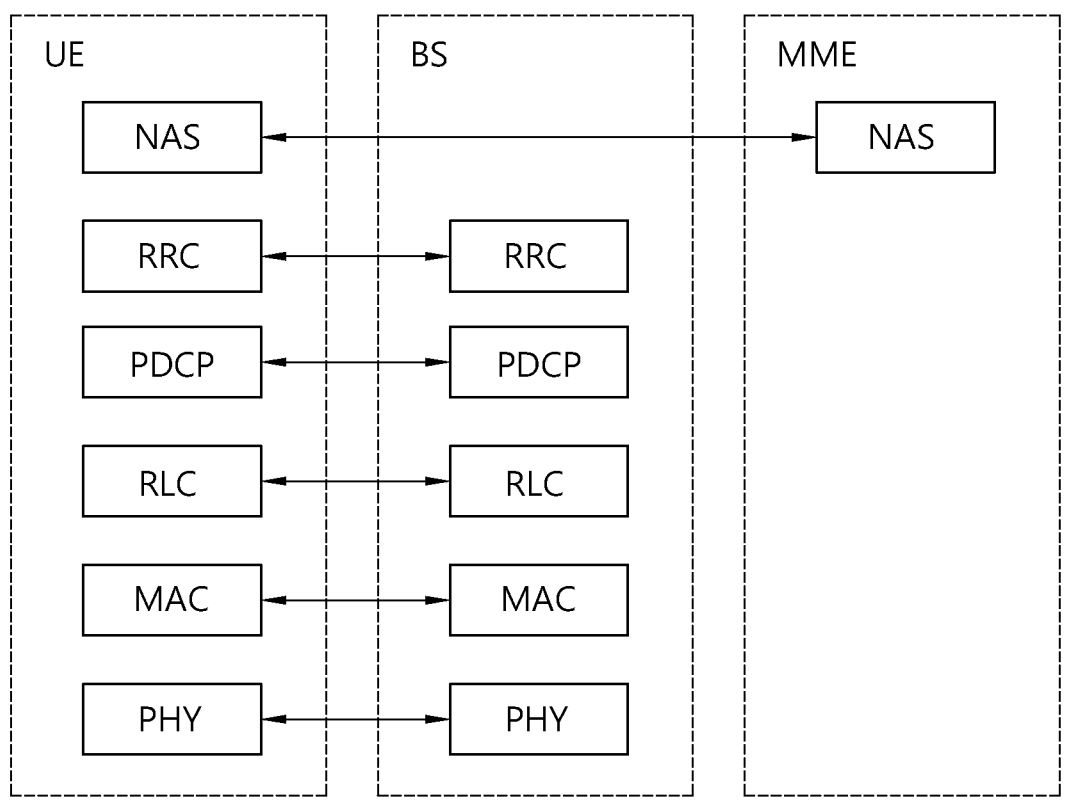
FIG. 2 is a view illustrating an example of a protocol structure to which the present invention is applied.

FIG. 2 is a diagram showing a radio protocol architecture for a user plane and a control plane. The user plane is a protocol stack for user data transmission. The control plane is a protocol stack for control signal transmission with RRC and NAS layers.

Referring to FIG. 2, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred to as an RRC connected mode), and otherwise the UE is in an RRC idle state (also may be referred to as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel.

Figure 3:
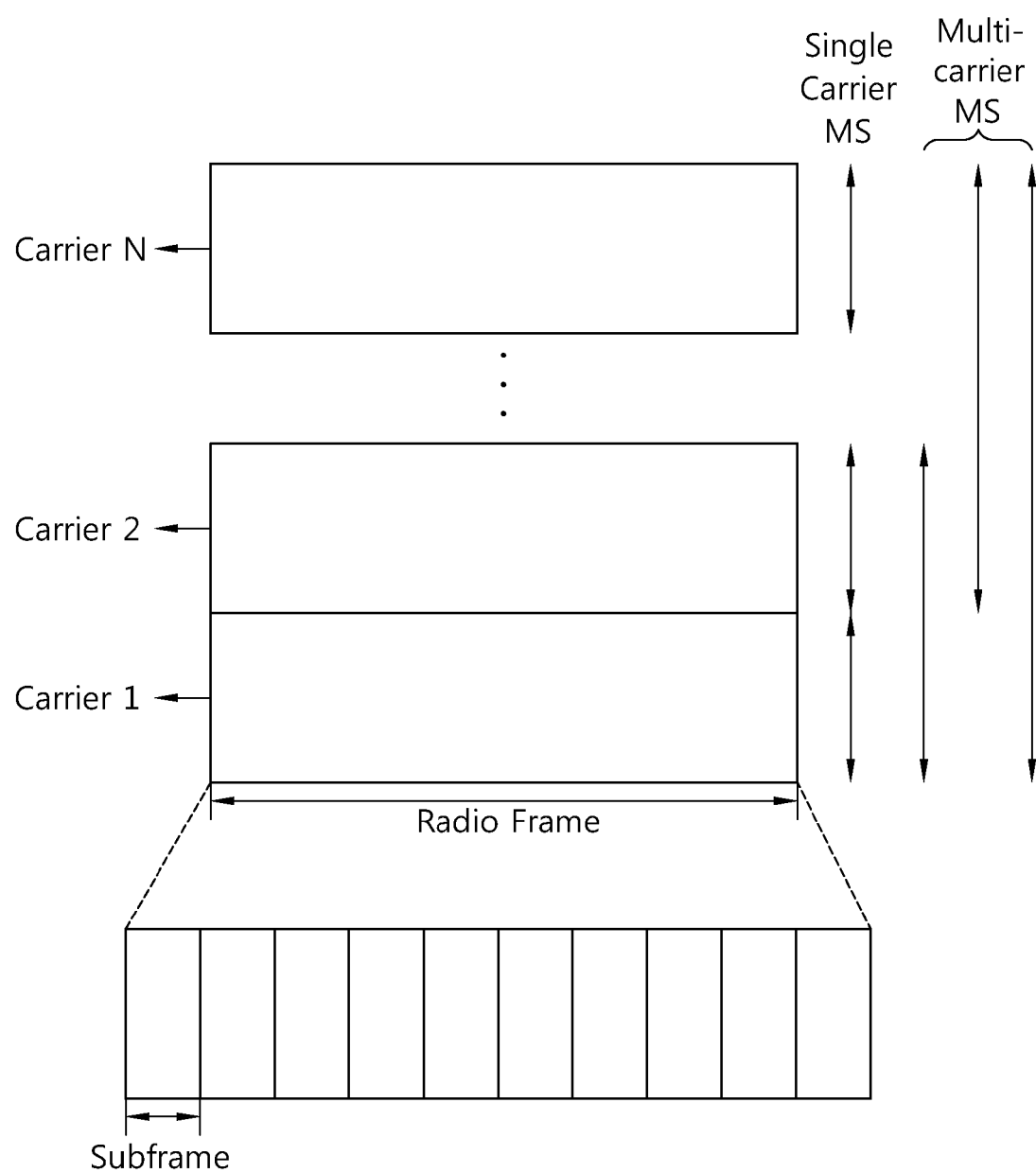
FIG. 3 is a view illustrating an example of a frame structure for a multi-carrier operation to which the present invention is applied.

FIG. 3 is a view illustrating an example of a frame structure for a multi-carrier operation to which the present invention is applied.

Referring to FIG. 3, a UE may support one or more carriers (Carrier 1 or more Carriers 2 . . . N) according to UE's capability thereof. Multiple carriers may be adjacent to each other or may not.

Component carriers may be divided into a primary component carrier (PCC) and a secondary component carrier (SCC) depending on whether or not they are activated. A PCC is a carrier which is constantly activated, and an SCC is a carrier which is activated or deactivated according to particular conditions. Here, activation refers to a state in which traffic data is transmitted or received or a state in which traffic data is ready to be transmitted or received. Deactivation refers to a state in which traffic data cannot be transmitted or received and measurement or transmission or reception of minimum information is available. The UE may use only one primary component carrier or one or more secondary component carriers along with a primary component carrier. The UE may be allocated a primary component carrier and/or a secondary component carrier from the BS.

A PCC is a carrier by which primary control information items are exchanged between a BS and an UE. An SCC is a carrier allocated according to a request from an UE or an instruction from a BS. A PCC may be used for an UE to enter a network and/or may be used to allocate an SCC. A PCC may be selected from among entire set carriers, rather than being fixed to a particular carrier. A carrier set as an SCC may also be changed into a PCC.

As described above, a DL CC may construct one serving cell, and the DL CC and a UL CC may construct one serving cell by being linked with each other. Further, a primary serving cell (PCell) corresponds to a PCC, and a secondary serving cell (SCell) corresponds to an SCC. Each carrier and combination of carriers may also be referred to as each one serving cell as a PCell or a SCell. That is, the one serving cell may correspond to only one DL CC, or may correspond to both the DL CC and the UL CC.

A Pcell is a resource in which the UE initially establishes a connection (or RRC connection) among several cells. The Pcell serves as a connection (or RRC connection) for signaling with respect to a plurality of cells (CCs), and is a special CC for managing UE context which is connection information related to the UE. Further, when the Pcell (PCC) establishes the connection with the UE and thus is in an RRC connected mode, the PCC always exists in an activation state. A SCell (SCC) is a resource assigned to the UE other than the Pcell (PCC). The SCell is an extended carrier for additional resource assignment, etc., in addition to the PCC, and can be divided into an activation state and a deactivation state. The SCell is initially in the deactivation state.

A MAC control element including an activation indicator has a length of 8 bits, is used for activation for each serving cell. Herein, a Pcell is implicitly regarded as being activated between the UE and the eNB and, thus the Pcell is not additionally included in the activation indicator. An index of the Pcell is always given a specific value, and it is assumed herein that the index is given 0. So the Scells are indexed with 1, 2, 3, . . . , 7 for a serving cell index 1 corresponds to a $7^{th}$ bit from the left, which are the remaining indices other than 0, i.e., the index of the Pcell. Herein, the index of the serving cell may be a logical index determined relatively for each UE, or may be a physical index for indicating a cell of a specific frequency band.

Figure 4:
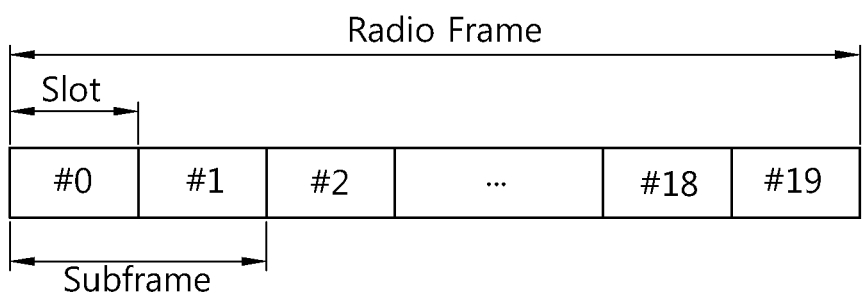
FIG. 4 shows the structure of a radio frame to which the present invention is applied.

FIG. 4 shows the structure of a radio frame to which the present invention is applied.

Referring to FIG. 4, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE and may be called an SC-FDMA symbol or a symbol period depending on a multi-access scheme. An RB is a resource allocation unit, and it includes a plurality of contiguous subcarriers in one slot.

The structure of the radio frame is only illustrative, and the number of subframes included in a radio frame or the number of slots included in a subframe and the number of OFDM symbols included in a slot may be changed in various ways.

In relation to resource allocation, a physical resource structure is first described.

Figure 5:
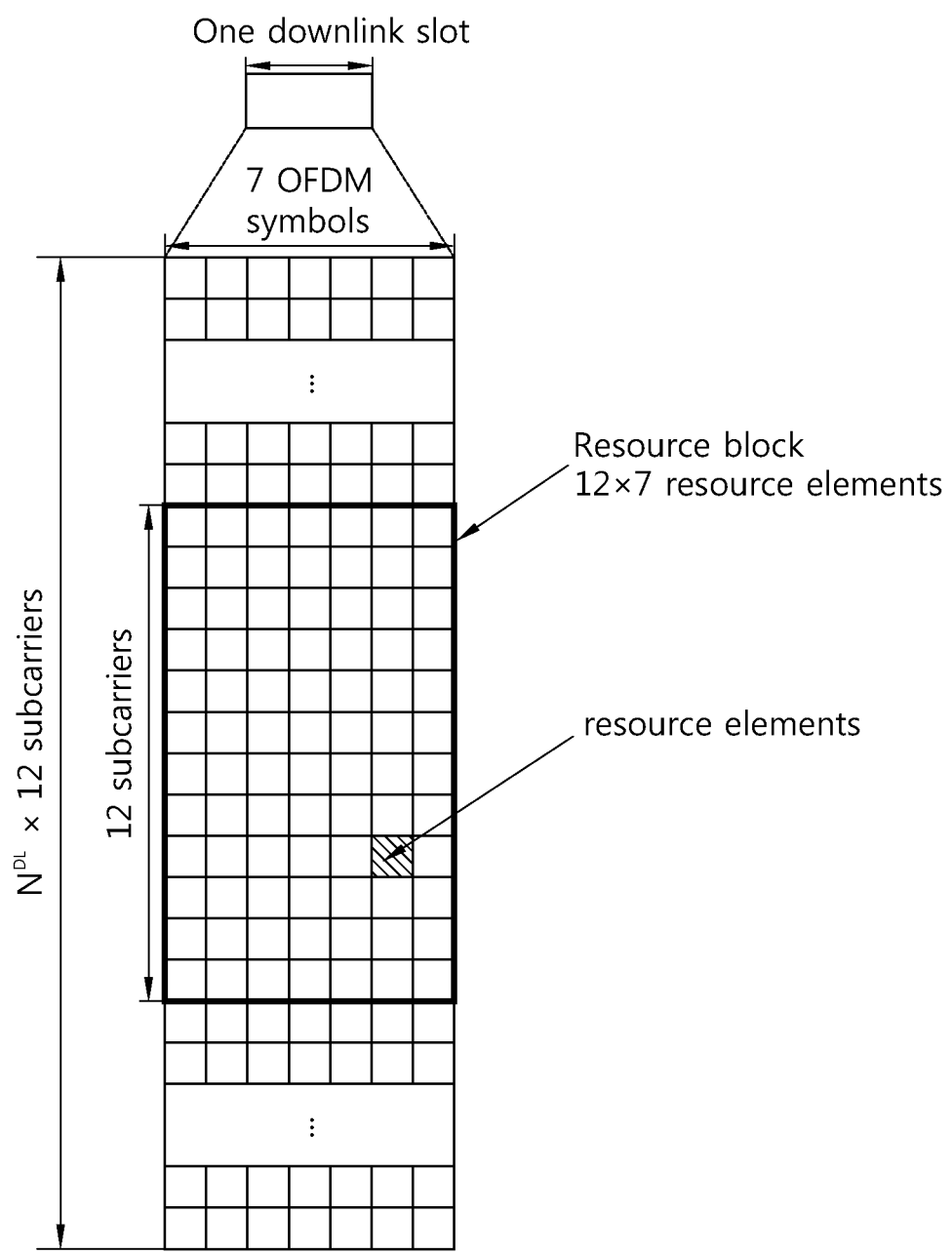
FIG. 5 is an exemplary diagram showing a resource grid for one downlink slot to which the present invention is applied.

FIG. 5 is an exemplary diagram showing a resource grid for one downlink slot to which the present invention is applied.

Referring to FIG. 5, the downlink slot includes a plurality of OFDM symbols in the time domain. Here, one downlink slot is illustrated as including 7 OFDMA symbols and one Resource Block (RB) is illustrated as including 12 subcarriers in the frequency domain, but not limited thereto.

Each element on the resource grid is called a Resource Element (RE). One resource block includes 12×7 REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively. One or more resource blocks corresponding to each band may be combined to form a Resource Block Group (RBG). For example, two contiguous resource blocks may form one resource block group.

In LTE, the total number of resource blocks for each bandwidth and the number of resource blocks that form one resource block group are shown in Table 1.

TABLE 1

| Bandwidth | Total number of RBs | Number of RBs belonging to one RBG | Total number of RBGs |
|---|---|---|---|
| 1.4 MHz | 6 | 1 | 6 |
| 3 MHz | 15 | 2 | 8 |
| 5 MHz | 25 | 2 | 13 |
| 10 MHz | 50 | 3 | 17 |
| 15 MHz | 75 | 4 | 19 |
| 20 MHz | 100 | 4 | 25 |

Referring to Table 1, the total number of available resource blocks is different depending on a given bandwidth. What the total number of resource blocks differs means that the size of information indicative of resource allocation is different.

Figure 6:
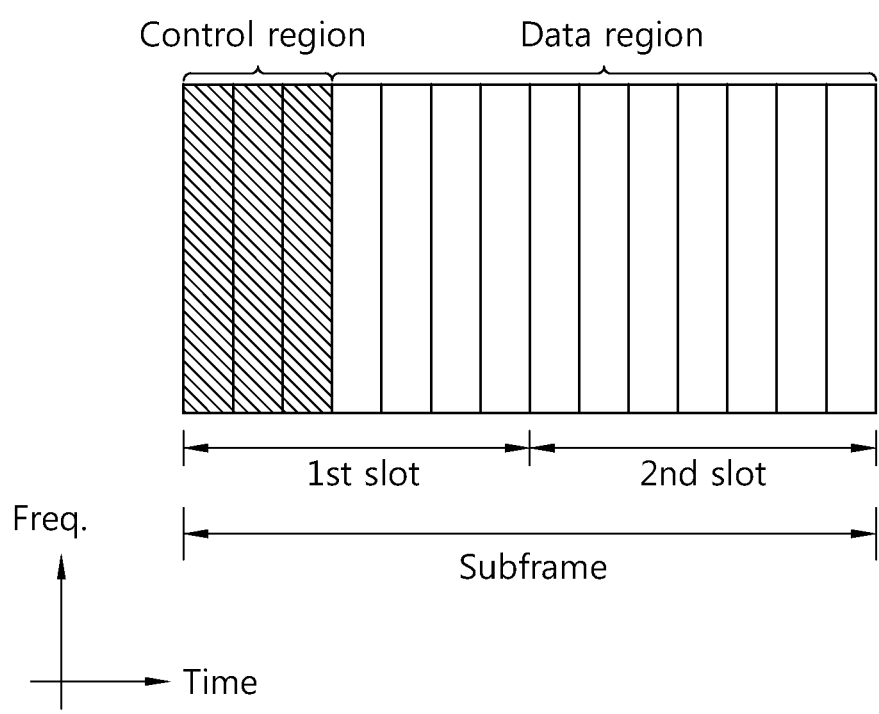
FIG. 6 shows the structure of a downlink subframe to which the present invention is applied.

FIG. 6 shows the structure of a downlink subframe to which the present invention is applied.

Referring to FIG. 6, a subframe includes two slots. The former 2 or 3 OFDM symbols of the first slot within the subframe correspond to a control region to which a PDCCH is allocated, and the remaining OFDM symbols thereof become a data region to which a PDSCH is allocated.

Downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH, that is, a downlink physical channel, is described below.

A PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. PDCCHs are transmitted on one Control Channel Element (CCE) or on an aggregation of some contiguous CCEs. A CCE is a logical assignment unit for providing a coding rate according to the state of a radio channel to a PDCCH. A CCE corresponds to a plurality of resource element groups (REGs). The format of a PDCCH and the number of possible bits of a PDCCH are determined by a correlation between the number of CCEs and a coding rate provided by CCEs.

Control information transmitted through a PDCCH is called Downlink Control Information (hereinafter referred to as DCI). The DCI includes uplink or downlink scheduling information or includes an uplink transmit (Tx) power control command for arbitrary UE groups. The DCI is differently used depending on its format, and it also has a different field that is defined within the DCI. Table 2 shows DCI according to a DCI format.

TABLE 2

| DCI format | Description |
|---|---|
| 0 | Used for the scheduling of a PUSCH (uplink grant) |
| 1 | Used for the scheduling of one PDSCH codeword |
| 1A | Used for the simplified scheduling of one PDSCH codeword and for a random access procedure reset by a PDCCH command |
| 1B | Used for the simplified scheduling of one PDSCH codeword using precoding information |
| 1C | Used for the simplified scheduling of one PDSCH codeword and the notification of a change of an MCCH |
| 1D | Used for precoding and the simplified scheduling of one PDSCH codeword including power offset information |
| 2 | Used for PDSCH scheduling for a UE configured in spatial multiplexing mode |
| 2A | Used for the PDSCH scheduling of a UE configured in large delay CDD mode |
| 3 | Used for the transmission of a TPC command for a PUCCH and PUSCH including 2-bit power coordination |
| 3A | Used for the transmission of a TPC command for a PUCCH and PUSCH including single bit power coordination |

The DCI Format 0 indicates uplink resource allocation information, the DCI formats 1~2 indicate downlink resource allocation information, and the DCI formats 3 and 3A indicate uplink Transmit Power Control (TPC) commands for specific UE groups. The fields of the DCI are sequentially mapped to an information bit. For example, assuming that DCI is mapped to an information bit having a length of a total of 44 bits, a resource allocation field may be mapped to a $10^{th}$ bit to $23^{rd}$ bit of the information bit.

The DCI may include resource allocation of the PDSCH (this is referred to as a downlink (DL) grant), resource allocation of a PUSCH (this is referred to as an uplink (UL) grant), a set of transmit power control commands for individual UEs in any UE group and/or activation of a voice over Internet protocol (VoIP).

Table 3 shows the DCI of Format 0, that is, uplink resource allocation information (or an uplink grant).

TABLE 3

Carrier indicator - 0 or 3 bits.
Flag for format0/format1A differentiation -1 bit, where value 0 indicates format 0 and value 1 indicates format 1A
Frequency hopping flag - 1 bit. This field is used for multi-cluster allocations as the MSB of the corresponding resource allocation if needed.
Resource block assignment and hopping resource allocation -
($\lceil \log_2(N_{RB}^{UL}(N_{RB}^{UL} + 1)/2) \rceil$) bits
   For PUSCH hopping (single cluster allocation only):
      $N_{UL\_hop}$ MSB bits are used to obtain the value of $\tilde{n}_{PRB}(i)$
      ($\lceil \log_2(N_{RB}^{UL}(N_{RB}^{UL} + 1)/2) \rceil$ - $N_{UL\_hop}$) bits provide the resource allocation of the first slot in the UL subframe
   For non-hopping PUSCH with single-cluster allocation:
      ($\lceil \log_2(N_{RB}^{UL}(N_{RB}^{UL} + 1)/2) \rceil$) bits provide the resource allocation in the UL subframe
   For non-hopping PUSCH with multi-cluster allocation: the resource allocation is obtained from the concatenation of the frequency hopping flag
field and the resource block assignment and hopping resource allocation field $$\left\lceil \log_2\left(\binom{\lceil N_{RB}^{UL}/P + 1\rceil}{4}\right) \right\rceil$$ bits provide the resource allocation in the UL subframe and where the value of P depends on the number of DL resource blocks
Modulation and coding scheme and redundancy version - 5 bits
New data indicator - 1 bit
TPC command for scheduled PUSCH - 2 bits
Cyclic shift for DM RS and OCC index - 3 bits
UL index - 2 bits (this field is present only for TDD operation with uplink-
downlink configuration 0)
Downlink Assignment Index (DAI) - 2 bits (this field is present only for TDD operation with uplink-downlink configurations 1-6)
CQI request - 1 or 2 bits. The 2-bit field only applies to UEs that are configured with more than one DL cell and when the corresponding DCI is
mapped onto the UE specific by C-RNTI search space
SRS request - 0 or 1 bit. This field can only be present in DCI formats scheduling PUSCH which are mapped onto the UE specific by C-RNTI search space.
Multi-cluster flag - 1 bit The flag is 1-bit information and is an indicator for distinguishing the DCI 0 and the DCI 1A from each other. The hopping flag is 1-bit information, and it indicates whether frequency hopping is applied or not when a UE performs uplink transmission. For example, when the hopping flag is 1, it indicates that frequency hopping is applied at the time of uplink transmission. When the hopping flag is 0, it indicates that frequency hopping is not applied at the time of uplink transmission. The resource block assignment and hopping resource allocation is also called a resource allocation field. The resource allocation field indicates the physical locations and amount of resources that are allocated to a UE. Although not shown in Table 3, an uplink grant includes redundant bits or padding bits for constantly maintaining the total number of bits. The DCI has several formats. Although DCI has control information of a different format, the length of bits can be identically controlled using the redundant bits. Thus, a UE can perform blind decoding smoothly.

For example, in Table 3, if the resource allocation field has 13 bits in a band of an FDD 20 MHz, an uplink grant has a total of 27 bits (except a CIF field and a CRC field). If the length of bits determined as the input of blind decoding is 28 bits, a BS makes the uplink grant the total number of 28 bits by adding the redundant bits of 1 bit to the uplink grant at the time of scheduling. Here, all the redundant bits may be set to 0 because they do not include special information. Of course, the number of redundant bits may be smaller than or greater than 2.

The wireless communication system as 3GPP LTE of the present invention uses blind decoding for PDCCH detection. The blind decoding is a scheme in which a desired identifier is de-masked from a CRC of a PDCCH (referred to as a candidate PDCCH) to determine whether the PDCCH is its own channel by performing CRC error checking.

An eNB determines a PDCCH format according to DCI to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH.

Figure 7:
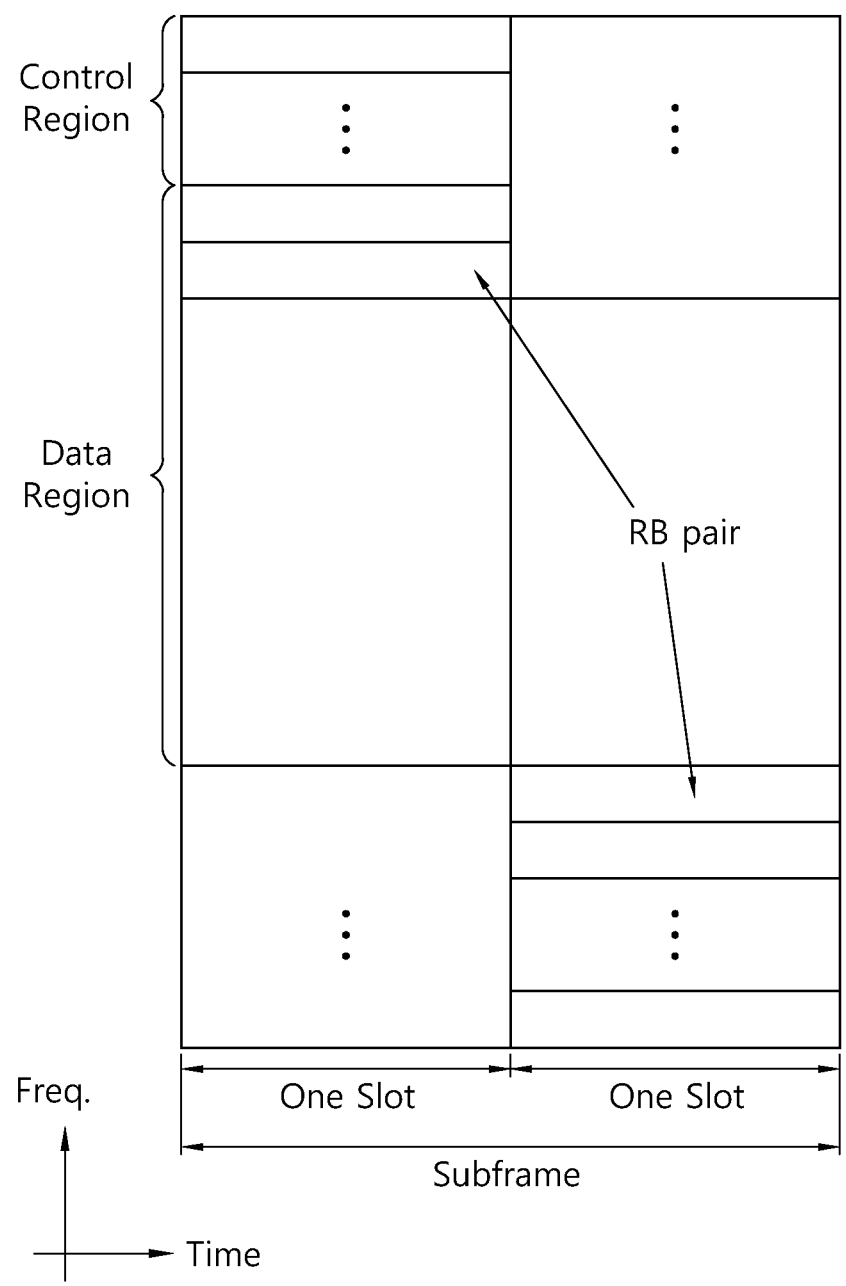
FIG. 7 shows the structure of an uplink subframe carrying an ACK/NACK signal to which the present invention is applied.

FIG. 7 is a view illustrating an example of a structure of an uplink subframe carrying an ACK/NACK signal to which the present invention is applied.

Referring to FIG. 7, an uplink subframe may be divided into a control region to which a physical uplink control channel (PUCCH) that carries uplink control information is allocated, herein, the control information includes an ACK/NACK response of downlink transmission. A data region to which physical uplink shared channel (PUSCH) that carries user data is allocated in the frequency domain.

To maintain a single-carrier property, one UE does not simultaneously transmit the PUCCH and the PUSCH. In the subframe, a pair of RBs are allocated to the PUCCH with respect to one UE, and the allocated resource block (RB) pair are resource blocks corresponding to different subcarriers in each of two slots. This is called that the RB pair allocated to the PUCCH are frequency-hopped at a slot boundary.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used.

Meanwhile, the volume and size of a data packet have been sharply increased in recent years. It expects that the data size is 50 times of what currently is for next 5-10 years. Current LTE is designed for multi-user environments where each subframe (an unit of data transmission in LTE) schedules multiple downlink data channel for multiple users. Roughly, each data channel requires around 1 to 20% overhead scheduling data channel. To reduce the control channel overhead, it would be desirable to schedule data over the entire system bandwidth (or schedule large size of data within a subframe). Yet, this may not be effective for frequency-selective scheduling or in FDM-based interference coordination cases (where data may be limited to subband).

Furthermore, the more the volume of data becomes (which will be achieved via many ways e.g., MIMO), the more control channels are required. Thus, more than three OFDM symbols (currently used for PDCCH in LTE) would be required for control channels. As control channels do not utilize spatial multiplexing, overall spectral efficiency will be decreased with the larger portion of control channels. It is also notable that the size of data that a UE requests at one time (i.e., the size of data packet at one time) becomes larger (such as High-Definition multimedia data, etc).

Overall, it is necessary to (1) reduce scheduling control overhead per data packet (2) increase data packet size per one transmission (3) reduce A/N overhead per data transmission.

This would be effective in carrier aggregation of unlicensed band as well. Assuming a macro is a PCell and an unlicensed band is aggregated as a SCell, all the control (scheduling PDCCH and A/N) may be transmitted over a PCell and actual transmission for data occurs via a SCell. To minimize interaction between a PCell and a SCell, it would be desirable to schedule burst transmissions at one time.

Figure 8:
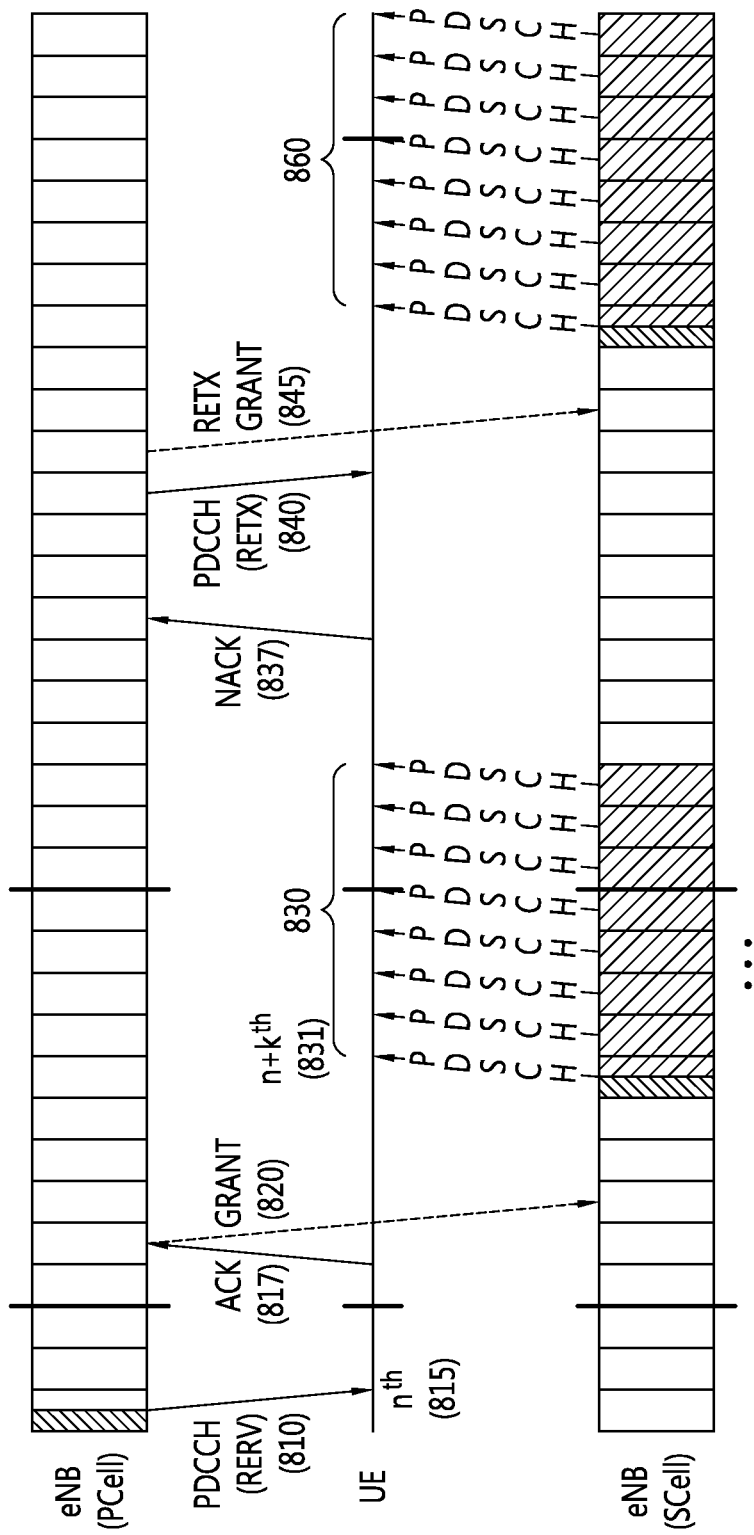
FIG. 8 shows an exemplary concept for Burst Transmission according to an exemplary embodiment of the present invention.

FIG. 8 shows an exemplary time structure for Burst Transmission according to an exemplary embodiment of the present invention. Especially, FIG. 8 illustrates an overall concept of burst transmission in LTE system.

Referring to FIG. 8, eNB includes a PCell and a SCell, where the PCell handles for control for the UE and SCell handles for data for the UE generally, and the PCell initiates a burst transmission process. This invention can also include that the Pcell and the Scell each can belong to each eNB with different coverage, herein the Scell can be controlled by an eNB for the Pcell and it can be used for only data extension.

The eNB transmits a special PDCCH initiating burst transmission via the Pcell, this PDCCH is used for burst transmission at $n+k^{th}$ subframe by assuming the PDCCH is transmitted at $n^{th}$ subframe using a reservation or an indication (810).

This PDCCH may include a number of PDSCHs to be transmitted in a burst transmission cycle (e.g., across $M_{burst\_cycle}$ subframes), a resource allocation map and MCS for PDSCH in each subframe. Herein, the same resource allocation is applied to all subframes across the burst transmission cycle ($M_{burst\_cycle}$) where frequency hopping will be applied across $M_{burst\_cycle}$ subframes. This PDCCH further may include a HARQ process ID, herein, the same HARQ process ID is shared among multiple PDSCHs for A/N purpose when A/N is transmitted simultaneously either via aggregation or individual. When A/N for each PDSCH is transmitted separately, a different HARQ ID in increasing order may be used instead of the same HARQ ID. A Burst Transmission ID (optionally) can be included in the PDCCH, if necessary, the Burst Transmission ID is used for identifying burst transmission to avoid ambiguity when A/N from the UE has not been received successfully, so that UE expects burst transmission where eNB may not start burst transmission. The burst transmission ID may be used for CRC for the burst transmitting PUSCHs/PDSCHs.

Upon receiving the reservation (or the indication) of PDCCH of burst transmission (815), the UE can transmit the ACK to inform the successful reception of the PDCCH of burst transmission to the eNB via the Pcell (817). This invention can include that the Pcell (eNB) sends DL grant information of the burst transmission to the Scell (eNB) optionally (820), after receiving the ACK from the UE if the Pcell and the Scell each can belong to each eNB.

At $n+k^{th}$ subframe, the eNB starts burst transmission of $M_{burst\_cycle}$ PDSCHs over the next $M_{burst\_cycle}$ subframes via the SCell (830). To address the ambiguity case and confirm starting of the burst transmission, first subframe (831) of the burst transmission may carry a PDCCH scheduling for the burst transmission. Herein, the eNB cannot exclude that the Pcell also transmits the burst transmission for data to the UE in this invention.

When UE receives the PDCCH scheduling for the burst transmission at subframe n+k, it can confirm the reception of ACK and start reception of burst transmission. At $n+k^{th}+M_{burst\_cycle}$ k subframe, UE can send an aggregated ACK or NACK for the PDSCHs received in the burst transmission cycle to the eNB (837).

This invention further includes that the PDCCH is transmitted in a first serving cell and wherein the PDCCH includes a number of PDSCHs to be transmitted in a second serving cell. herein the first serving cell can be a PCell or also a SCell. that is, this invention can include that a serving cell and the other serving cells each can belong to each eNB with different coverage, herein the one serving cell can be a controller serving cell for the other serving cells and the serving cells each can be used for only data extension.

Herein, the UE can send the ACK/NACK of one among the One A/N for all PDSCH, a Separate A/N for each PDSCH, a Selective A/N including ACK if the UE receives more than R PDSCHs out of N PDSCHs or NACK otherwise, and ACK if the UE receives more than R PDSCHs out of N PDSCHs and NACK with the number of NACKed PDSCHs. That is, a sending the ACK/NACK includes that a signal including at least one ACK/NACK is transmitted, herein the ACK/NACK is one of the 4 cases such as, a single ACK/NACK for all PDSCHs, a separate ACK/NACK for each PDSCH, a selective ACK/NACK including ACK or NACK, and ACK with the number of NACKed PDSCHs. It may be described more details as below.

Upon receiving ACK from the UE, the PCell informs the SCell the successful transmission of the session for the burst transmission if the eNB of the SCell is different from the PCell's. Upon receiving NACK from the UE, the PCell informs the SCell the failure of successful transmission or grant RE-transmission of the burst transmission, or grant only a portion of burst transmission if NACK with the number NACKed PDSCHs is transmitted by the UE (840, 845). When NACK occurs, appropriate retransmission is attempted if HARQ process is enabled (860).

Herein, the eNB determines to use a SCell which is an unlicensed band for convenience. Assuming that PCF (Point Coordination Function) is supported in unlicensed band so that a portion of time can be reserved for LTE operation. A SCell informs a PCell the duration of reserved time, so that it can schedule burst transmission accordingly. If PCF is not used, before first burst transmission occurs, channel acquisition is necessary. In this case, reservation PDCCH may not be needed as the latency between reservation PDCCH and the first transmission of burst transmission varies depending on channel acquisition time. If reservation PDCCH is not used, ACK from UE is not necessary either.

This invention can include that the burst transmission may be supported for the PUSCH transmission as well which will be discussed in below with a DCI format 0 modifications which is used for uplink grant.

Meanwhile, this invention can also include that the MAC Layer can be changed. To effectively utilize the proposed approach, the maximum TB size transmitted by MAC layer to PHY layer may be increased. As HARQ timing is changed, necessary changes at MAC layer to reflect a new HARQ timing depending on the burst transmission cycle which will be informed by PHY layer to MAC layer.

Further, this invention is described following approaches of a potential loss of the reservation PDCCH or the ACK. To improve the performance of burst transmission, the reservation PDCCH has to be successfully received.

Here, a redundant reservation PDCCH can be applied. The PDCCH is for burst transmission. The same or slightly different PDCCH is also transmitted at the start of burst transmission. When the UE has not received the first reservation PDCCH and received the second PDCCH, it shall assume the first reservation has lost and starts the receiving of burst transmission. When the UE has received the first but not the second PDCCH, it can receive the burst transmission with the reservation through the first PDCCH. This scheme assumes that once eNB issues the reservation PDCCH, it will transmit burst transmission regardless of ACK from the UE.

On the other hand, the UE may assume that burst transmission occurs only when both PDCCHs are received successfully. The drawback of this option compared to the first where UE assumes that either PDCCH has been received, there will be burst transmission is when the UE has not received the second PDCCH or the first, it may not receive the whole burst transmission either. The reason still the UE may transmit ACK to the eNB to inform whether the grant has been received or not. When the eNB receives ACK from the UE, it shall schedule burst transmissions. Otherwise, it may schedule the same resource to different UE. To allow processing latency at eNB side to determine different scheduling in case ACK has not been received, instead of assuming burst transmission will start at 4 msec afterwards, 4+n (n>0, msec) may be assumed.

In the present invention, as a solution that a reliability of ACK from the UE can be improved is further defined. The A/N reception probability can be improved by power control or decreased code rate, so that the eNB may be able to assume that when the ACK has not been received, thus it may attempt retransmission of reservation PDCCH when the reservation of PDCCH has not been received by the UE. To support this, the power control calculation for ACK for reservation PDCCH shall be boosted such as following equation 1:

$$P_{PUCCH}(i) = \min\begin{Bmatrix} P_{CMAX,c}(j), \\ P_{0\_PUCCH} + PL_c + h(n_{CQI}, n_{BurstTx}, n_{SR}) + \Delta_{F\_PUCCH}(F) + \Delta_{T \times D}(F') + g(i) + \Delta \end{Bmatrix} [dBm] \qquad \langle\text{equation 1}\rangle$$

where, $\Delta$ is the boosting value for ACK on reservation PDCCH, that is an offset for the burst transmission. And the $n_{\_BurstTX}$ is the number of PDSCHs for the burst transmission. The UE can apply the power control for the ACK considering the offset for the burst transmission and the number of subframes for PDSCHs of the burst transmission.

Also, a burst transmission session ID used in PDSCH can be further applied in this invention. To avoid the ambiguity when the UE has sent ACK where the eNB has not received it and thus schedule the same resource to another UE원 PDSCH, for burst transmission PDSCHs, burst transmission session ID (e.g., UE C-RNTI, a separate ID for each burst transmission allocated via reservation PDCCH, etc) can be used in PDSCH. The ID can be used for scrambling or additional bits can be added for the ID either the first few bits or the last few bits.

For more efficient a redundant Reservation of the PDCCH, when another PDCCH is used for identifying burst transmission or confirming burst transmission reservation, the fields may be same to the reservation PDCCH. More specifically, a retransmission of the reservation PDCCH is described.

When eNB starts burst transmission only when it has received ACK from the UE, retransmission of reservation PDCCH may occur. In this case, Redundancy Version (RV) field in DCI format 1a (or other formats) may be used to indicate the number of retransmissions up to now (1 at the first retransmission). Or, retransmission of reservation PDCCH may be identical to the original PDCCH unless the resource allocation has been changed. Retransmission of reservation PDCCH may carry different resource allocation and MCS from the previous accordingly.

If retransmission of reservation PDCCH is used along with RV, this RV may be used for power boosting such as following equation 2.

$$P_{PUCCH}(i) = \min\begin{Bmatrix} P_{CMAX,c}(i), \\ P_{0\_PUCCH} + PL_c + h(n_{CQI}, n_{BurstTX}, n_{SR}) + \Delta_{F\_PUCCH}(F) + \Delta_{T \times 0}(F') + \dfrac{\Delta_{T \times D}(F') + g(i) + RV \times \Delta}{} \end{Bmatrix} [dBm] \qquad \langle\text{equation 2}\rangle$$

This equation implies that power boosting is increased linearly with RV, the $\Delta$ is an value for ACK on reservation PDCCH, that is, an offset for the burst transmission, and the number of subframes for the burst transmission, so that ACK from the UE will be received by eNB more successfully.

In case of the invention, more than 1 TB (Transport Block) with MIMO is scheduled, appropriate DCI format would be used.

Figure 9:
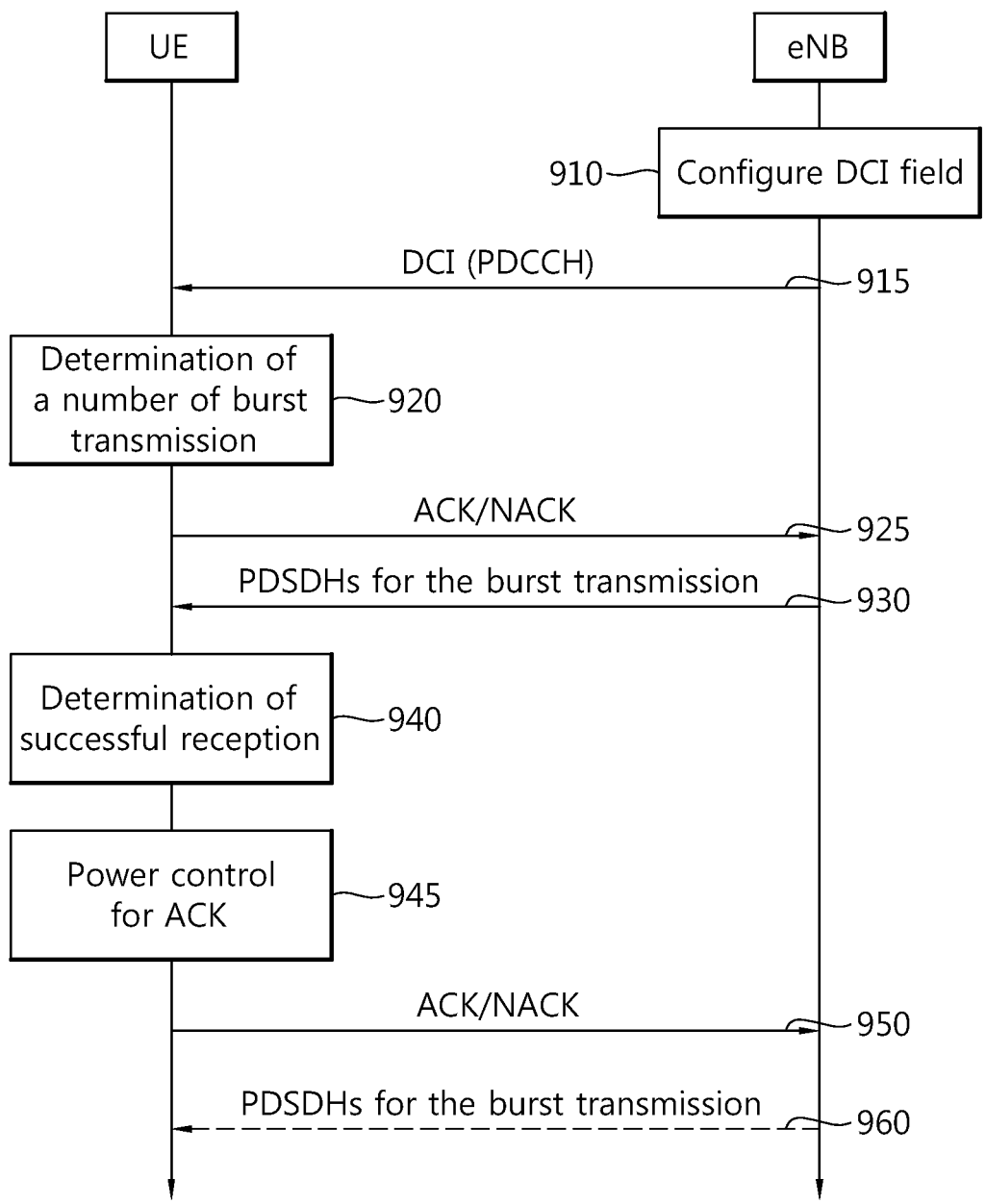
FIG. 9 shows an exemplary flow chart for Burst Transmission according to an exemplary embodiment of the present invention.

In relation to this situation, the operation of burst transmission will be described with reference to FIG. 9. FIG. 9 shows an example on the operation process of the burst transmission between UE and the eNB according to the present invention.

Referring to FIG. 9, the eNB sets configurations for the burst transmission and configures DCI (910).

At this step, the eNB can modify a specific field of a corresponding DCI. At this time, a DCI Format Modification for Reservation PDCCH be defined as follows. Firstly, a DCI Format 0 supporting the burst transmissions (PUSCH) can be used for scheduling burst uplink transmission. Without modifying DCI format 0, each field may be used as follows. The 0/1A field identifies a bit indicator to indicate format 0 or 1A, the FH field identifies that frequency hopping is enabled or not, and the Compact resource allocation bits field identifies a resource allocation for PUSCH. Further, the MCS/RV field identifies a MCS for PUSCH, the NDI field identifies a New Data Indicator or not, and the TPC field may be used for power control or the TPC field may be used for indicating the number of burst uplink transmission subframes in this invention. And the DM-RS field identifies a uplink DM-RS cyclic shift value, the CQI field may be used for initiating CQI or reused for indicating the number of burst uplink transmission subframes combined with TPC in this invention. Herein the ZP may be used for the number of uplink transmission subframes or used for the indication of uplink grant for burst transmission. The BTTI (3 bits) is a new field that may be used for indicating the number of burst transmission subframes.

If two bits are used for the number of burst transmission subframes, the values can be mapped to numbers as Table 4 below.

TABLE 4

| Two bits | Number of burst transmission |
|---|---|
| 00 | 2 |
| 01 | 4 |
| 10 | 8 |
| 11 | 16 |

If three bits are used for the number of burst transmission subframes, the mapping may follow as Table 5 below.

TABLE 5

| three bits | Number of burst transmission |
|---|---|
| 000 | 2 |
| 001 | 4 |
| 010 | 6 |
| 011 | 8 |
| 100 | 10 |
| 101 | 12 |
| 110 | 16 |
| 111 | 32 |

In addition, a few options can be considered to differentiate whether uplink grant is for a regular PUSCH transmission or burst PUSCH transmission.

A different C-RNTI for uplink grant for burst PUSCH transmission can be used, it is allocated two C-RNTIs as a C-RNTI and a Burst-C-RNTI for a UE which is capable of performing burst transmission. A UE may inform the capability to a eNB at connection phase with indication which RNTI will be used for burst transmission grant.

DCI format 0 can add a flag, such that a Zero Padding (ZP) field may be used for the flag to differentiate between regular and burst transmission grant by assuming the ZP is not used for the number of burst transmissions. It can be set to '1' for burst transmission and to '0' for regular grant.

A set of DM-RS cyclic shift values for burst transmissions can be reserved for a UE which has the capability to transmit burst PUSCHs, a few DM-RS shift values can be reserved for burst transmission so that when a UE receives the grant, it can determine between normal and burst transmission grant.

When a UE has received a burst transmission grant, a higher layer shall prepare the burst transmission which may need more delay than normally assumed latency (i.e., 4 msec). Thus, when a UE receives a burst transmission grant at $n^{th}$ subframe, a UE starts the first PUSCH transmission at $n+6^{th}$ (in FDD) and $n+k^{th}$ (k is the first available uplink where k>=6).

Considering encoding latency, where encoding may occur over multiple TBs, the latency may be increased further (e.g., $n+8^{th}$ (in FDD) and $n+k^{th}$ (k is the first available uplink where k>=8)). Furthermore, this latency value may be configured by higher-layer signaling.

If uplink carrier aggregation is supported, a CIF (carrier indicator) field can be used to indicate the carrier where the burst transmission occurs.

Otherwise, a DCI Format 1A supports the burst transmissions, each field in the DCI format 1A may be used as follows. When downlink carrier aggregation is supported, a CIF is used for a corresponding carrier where burst PDSCHs will be transmitted. Further, a HARQ process number field identifies to differentiate a normal PDCCH scheduling a PDSCH from the special PDCCH scheduling burst PDSCH transmissions. A set of HARQ processes can be reserved for burst transmissions such that HARQ #0 is reserved for burst transmission. If this applied, by receiving the HARQ process number, a UE which is capable of receiving burst transmission can determine the PDCCH type. Regardless of whether this is used or not, the HARQ process for the burst transmissions can be shared. A New data indicator field identifies to mean a new set of burst transmission if reservation of a set of HARQ #s for burst transmissions is used. Otherwise, this indicates the new data for the HARQ process index. A Redundancy version field may be used to represent the number of burst transmission subframes if reservation of a set of HARQ #s for burst transmissions is used, otherwise, it will be used for redundancy version. And a BTTI (2 or 3 bits) is a new field that may be used for indicating the number of burst transmission subframes.

By way of example, when a UE is configured with a number of configurations for burst transmissions, 2 bits will be used as Table 6 below. Each configuration may include the number of burst transmission subframes, resource allocations, burst transmission ID, etc. This can be applied to burst PUSCH transmissions as well.

TABLE 6

| Two bits | Number of burst transmission |
|---|---|
| 00 | Per configuration 0 |
| 01 | Per configuration 1 |
| 10 | Per configuration 2 |
| 11 | Per configuration 3 |

A Reservation DCI (1 bit) can also be used for indicating whether this DCI is for the first reservation PDCCH or redundant PDCCH along with PDSCH at the first transmission. When this field is set to '1', the DCI is for the reservation and it is for the redundant DCI otherwise.

For other DCI formats, a similar approach is applied to different DCI format such that RV may be used for the number of burst transmission or a new field may be added for the number of burst transmission. If RV is used for the number of burst transmission, with DCI format 2 or 2A, only the first RV field is used for it and the second RV field is reserved unless second TB is disabled.

The eNB sends the corresponding DCI through a PDCCH (915). Upon receiving the PDCCH of burst transmission, the UE determines a number of PDSCHs subframes to be transmitted in the burst transmission cycle using the PDCCH (920).

The UE can transmit the ACK of the response of the PDCCH for the burst transmission to the eNB (925). The UE receives PDSCHs for the burst transmission via a corresponding serving cell (930).

The UE confirms whether the PDSCHs are transmitted successfully in burst transmission time or not, by using information as a burst transmission cycle and the number of the PDSCHs sunframes for the burst transmission (940).

In addition to, the UE determines at least one response signal of a A/N for the PDSCHs. Herein, a A/N handling for burst transmission of the burst PDSCHs which the present invention applies is now described.

Firstly, a single A/N for all PDSCHs can be transmitted for the whole transmissions. If the UE has received the total number of burst PDSCHs successfully, it transmits one ACK. It transmits a NACK otherwise. Here, a A/N timing in FDD is 4 msec afterwards since the last PDSCH subframe. It is a Channel selection when two CCs are aggregated or an A/N multiplexing using PUCCH format 2a/2b or 3 can be used in FDD. For TDD, all downlink subframes except for the last PDSCH can be treated as 'DRX' from A/N perspective such that A/N for all PDSCHs except for the last PDSCH in A/N timing can be treated as TX? for PUCCH format 1a/b, 2a/b, and 3. For the A/N bit for the last PDSCH, the A/N decision is based on whether the total burst transmissions are received successfully or not. When NACK is received or no A/N is received by the eNB, it initiates the retransmission of the total PDSCHs.

Or, a separate A/N for each PDSCH is transmitted per PDSCH on following A/N timing. A separate retransmission for the NACKed PDSCH can be attempted or retransmission of the total PDSCHs can be attempted as well. A burst transmission can be scheduled with for the retransmission where the burst transmission only includes the PDSCHs which have not been received successfully (i.e., NACKed PDSCHs). For example, initially, 10 PDSCHs are transmitted and only two PDSCHs are NACKed, a burst transmission with burst cycle of 2 can be scheduled to retransmit. If separate A/N for each PDSCH is used, PUCCH format 3 may be used. The resource for PUCCH 3 may be RRC signaled (so that it is semi-statically fixed) or signaled via reservation PDCCH (by adding a new field to include ARI).

Or, an aggregated A/N for the burst transmission can be transmitted for the whole transmissions. A single A/N with $M_{burst\_cycle}$ bits is transmitted for the $M_{burst\_cycle}$ PDSCHs where MSB bit is for the first PDSCH and LSB bit is for the last PDSCH. For this approach, all PDSCH transmissions will be treated as 'DRX' from A/N perspective. Once the last PDSCH transmission is completed, the UE will transmit the aggregated A/N at k subframes afterwards (where k is larger than 4 which may be higher-layer configurable). This aggregated A/N may be transmitted via SPS PUSCH (a special SPS PUSCH can be configured which will be used for A/N transmission for burst transmission) or eNB may trigger A/N transmission (where eNB sends a special uplink grant to allow UE to transmit A/N for the burst transmission once the transmission ends, it may come with the last PDSCH). Retransmission approach is similar to the separate A/N for each PDSCH in the above description Or, a selective A/N can be transmitted. A/Ns for a portion of PDSCHs can be transmitted where the portion is pre-configured by higher-layer signaling. In terms of transmitting A/N bits, it is similar to one aggregated A/N in above. Retransmission approach is similar to the separate A/N for each PDSCH in the above description.

Or, ACK if the UE receives more than R PDSCHs out of N PDSCHs, NACK otherwise can be transmitted. If the UE has received successfully more than 'R' PDSCHs out of $M_{burst\_cycle}$ PDSCHs, it transmits ACK. It transmits NACK otherwise. Only one bit A/N is transmitted. Transmitting scheme is similar to approach of the one A/N for all PDSCHs. When NACK is received or no A/N is received by eNB, it initiates the retransmission of the total PDSCHs.

Or, ACK if the UE receives more than R PDSCHs out of N PDSCHs, NACK with the number of NACKed PDSCHs otherwise can be transmitted. This may require the changes of A/N format. The idea is to transmit ACK if the UE has received more than 'R' PDSCHs out of $M_{burst\_cycle}$ PDSCHs and NACK otherwise. When it transmits NACK, it also transmits the indices of NACKed PDSCHs so that eNB can selectively retransmit. Retransmission approach is similar to the separate A/N for each PDSCH in the above description.

This invention can also include that Burst PUSCHs can be applied to PHICH as well in the above.

Herein, the UE can apply a power control as power boosting calculation for the ACK (945). The power control for the ACK is considered an offset as a value for ACK on a reservation PDCCH for the burst transmission, the number of PDSCHs subframes, and additionally a Redundancy Version (RV) indicating a number of retransmission of the PDCCH for the burst transmission.

The UE sends the ACK/NACK applied with the ACK/NACK determination and the power boosting according to the invention (950).

Thus, the eNB controls the PDSCHs to be transmitted or to be re-transmitted according to the ACK from the UE (960).

Herein, the Burst transmission in this invention may be scheduled via SPS (semi-persistent scheduling) configuration where SPS interval will be 1 TTI. Activation PDCCH of the preconfigured SPS may include the number of occurrences of SPS transmission so that UE knows the duration of burst transmission. The SPS configuration can apply both PDSCH and PUSCH. When the SPS interval is 1 msec, a UE may assume that the SPS is configured for burst transmission, and thus expect that Activation PDCCH will include the number of burst transmissions and there will be no deactivation PDCCH.

Furthermore, the SPS of burst transmission may be scheduled such that the SPS configuration includes information of burst transmission along with interval where burst transmissions will occur periodically according to SPS interval and multiple PUSCH or PDCCH will be transmitted every SPS occasion.

For this invention, the following can be a candidate format for Activation PDCCH as Table 7 below. For example, a TPC field may be used for indicating the duration of burst transmission in DCI Format 0 and a RV field may be used for indicating the duration of burst transmission in DCI Format 1A/2A.

TABLE 7

| Two bits | Number of burst transmission |
|---|---|
| 00 | 2 |
| 01 | 4 |
| 10 | 8 |
| 11 | 16 |

Figure 10:
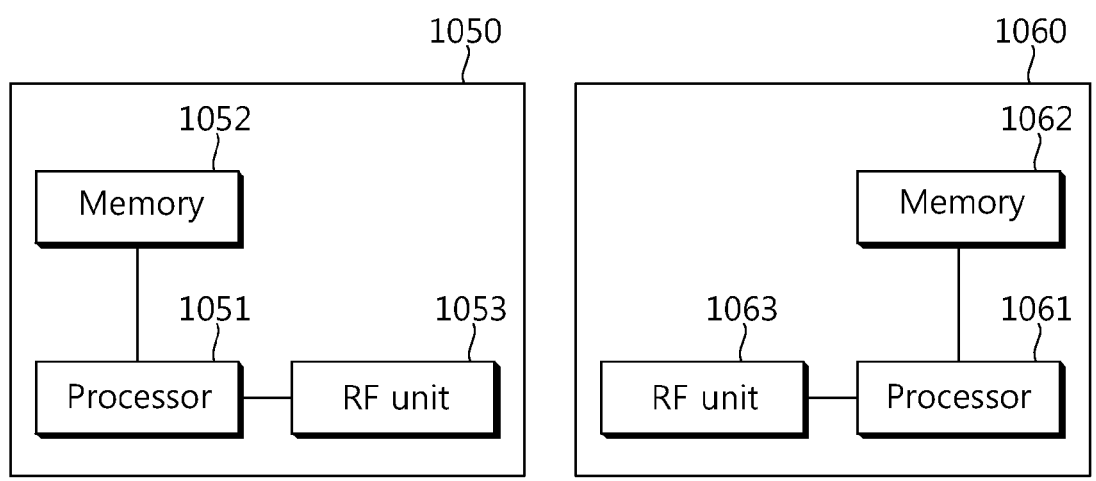
FIG. 10 shows a block diagram showing a wireless communication system according to an exemplary embodiment of the present invention.

FIG. 10 is a block diagram showing a wireless communication system according to an embodiment of the present invention.

ABS 1050 includes a processor 1051, a memory 1052, and a radio frequency (RF) unit 1053. The memory 1052 is coupled to the processor 1051, and stores a variety of information for driving the processor 1051. The RF unit 1053 is coupled to the processor 1051, and transmits and/or receives a radio signal. The processor 1051 implements the proposed functions, procedures, and/or methods. In the embodiments of FIG. 8 to FIG. 9, the operation of the BS can be implemented by the processor 1051.

Especially, the processor 1051 may configure at least one serving cell configuration for burst transmission and optionally SPS (semi-persistent scheduling) configuration. Herein, the cell configuration includes an index of the cell, a center frequency of each cell, and information of CA between the serving cells for burst transmissions by a RRC signal. The SPS configuration includes information of burst transmission with interval where burst transmissions is occurred, and information of multiple PUSCH or PDCCH to be transmitted by a RRC signal.

The processor 1051 may configures a DCI which is used for the burst transmission, more details, and the processor 1051 selects a DCI format, and modifies s specific field corresponding to the selected DCI format for the burst transmission. The processor 1051 may also configure a PDCCH or a special PDCCH initiating burst transmission, control to send the PDCCHs including the special PDCCH via a corresponding serving cell each and send DL grant information of the burst transmission to a cell optionally.

This invention can include that the processor 1051 manages a number of PDSCHs to be transmitted in a burst transmission cycle, and determines at least one ACK/NACK and retransmits the PDSCHs for the burst transmission.

A wireless device 1060 includes a processor 1061, a memory 1062, and an RF unit 1063. The memory 1062 is coupled to the processor 1061, and stores a variety of information for driving the processor 1061. The RF unit 1063 is coupled to the processor 1061, and transmits and/or receives a radio signal. The processor 1061 implements the proposed functions, procedures, and/or methods. In the embodiments of the FIG. 8 to FIG. 9, the operation of the UE can be implemented by the processor 1061.

Especially, the processor 1061 may configure at least one serving cell configuration for burst transmission and optionally SPS (semi-persistent scheduling) configuration for the burst transmission. Herein, the processor 1061 may configure two more cells for the CA using the UE capability procedure. The cell configuration includes an index of the cell, a center frequency of each cell, and information of CA between the serving cells for burst transmissions by a RRC signal. The SPS configuration includes information of burst transmission with interval where burst transmissions is occurred, and information of multiple PUSCH or PDCCH to be transmitted by a RRC signal.

The processor 1061 may determine a DCI which is configured for the burst transmission, more details, and the processor 1061 determine a DCI format to be selected, and determine a specific field to be modified according to the DCI format selected for the burst transmission. The processor 1061 may also determine a different PDCCH for the burst transmission with a normal PDCCH, control to determine the PDCCHs including the special PDCCH transmitted via a corresponding each serving cell.

This invention can include that the processor 1061 determines a number of PDSCHs to be transmitted in a burst transmission cycle by a PDCCH for the burst transmission. And the processor 1061 can determine at least one ACK/NACK about the PDSCHs after receiving the PDSCHs in a burst cycle, and determine power control of the ACK/NACK for the burst transmission. Herein, the processor 1061 can apply the power control for the ACK/NACK considering an offset for the burst transmission, a number of PDSCHs subframes for the burst transmission, and optionally a Redundancy Version (RV) indicating a number of retransmission of the PDCCH.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for supporting burst transmission in a wireless communication system supporting multiple carriers, performed by a wireless device, the method comprising:
receiving a physical downlink control channel (PDCCH) for the burst transmission via a first serving cell at nth subframe;
transmitting a response signal of the PDCCH via the first serving cell;
receiving physical downlink shared channel (PDSCH)s for the burst transmission via a second serving cell from n+kth subframe; and
transmitting an ACK/NACK signal of the PDSCHs via the first serving cell,
wherein the ACK/NACK signal is a single ACK/NACK signal for the PDSCHs, a separate ACK/NACK signal for each PDSCH of the PDSCHs, or a selective ACK/NACK for the PDSCHs,
wherein the selective ACK/NACK signal comprises an ACK signal if more than R PDSCHs out of N PDSCHs are received,
wherein the selective ACK/NACK signal comprises a NACK signal if more than R PDSCHs out of N PDSCHs are not received successfully, and
wherein a power control for the transmitted ACK/NACK signal is applied considering an offset and a number of PDSCHs subframes for the burst transmission or considering a Redundancy Version (RV) indicating a number of retransmissions of the PDCCH.

2. The method of claim 1, further comprising:
wherein the PDCCH includes a number of PDSCHs to be transmitted in a burst transmission cycle, and
wherein the first serving cell is a primary serving cell (PCell) and the second serving cell is a secondary serving cell (SCell).

3. The method of claim 1, further comprising:
determining a PDCCH scheduling for the burst transmission at the n+k$^{th}$ subframe; and
confirming a number of PDSCH subframes to be transmitted in the burst transmission cycle using the PDCCH scheduling for the burst transmission.

4. The method of claim 3, further comprising:
determining whether the burst transmission is scheduled via semi-persistent scheduling (SPS) configuration.

5. A wireless device for supporting burst transmission in a wireless communication system supporting multiple carriers, comprising:
   a radio frequency unit for receiving a radio signal; and
   a processor, operatively coupled with the radio frequency unit, configured to:
      receive a physical downlink control channel (PDCCH) for the burst transmission via a first serving cell at $n^{th}$ subframe,
      transmit a response signal of the PDCCH via the first serving cell,
      receive physical downlink shared channel (PDSCH)s for the burst transmission via a second serving cell from $n+k^{th}$ subframe; and
      transmit an ACK/NACK signal of the PDSCHs via the first serving cell,
   wherein the ACK/NACK signal is a single ACK/NACK signal for the PDSCHs, a separate ACK/NACK signal for each PDSCH of the PDSCHs, or a selective ACK/NACK for the PDSCHs,
   wherein the selective ACK/NACK signal comprises an ACK signal if more than R PDSCHs out of N PDSCHs are received,
   wherein the selective ACK/NACK signal comprises a NACK signal if more than R PDSCHs out of N PDSCHs are not received successfully, and
   wherein a power control for the transmitted ACK/NACK signal is applied considering an offset and a number of PDSCHs subframes for the burst transmission or considering a Redundancy Version (RV) indicating a number of retransmissions of the PDCCH.

6. The wireless device of claim 5, wherein the processor is configured that:
   the PDCCH includes a number of PDSCHs to be transmitted in a burst transmission cycle, and
   wherein the first serving cell is a primary serving cell (PCell) and the second serving cell is a secondary serving cell (SCell).

7. The wireless device of claim 6, wherein the processor is configured to:
   determine a PDCCH scheduling for the burst transmission at the $n+k^{th}$ subframe; and
   confirm a number of PDSCH subframes to be transmitted in the burst transmission cycle using the PDCCH scheduling for the burst transmission.

8. The wireless device of claim 7, the processor is further configured to:
   determine whether the burst transmission is scheduled via semi-persistent scheduling (SPS) configuration.

* * * * *